Figure 1A:
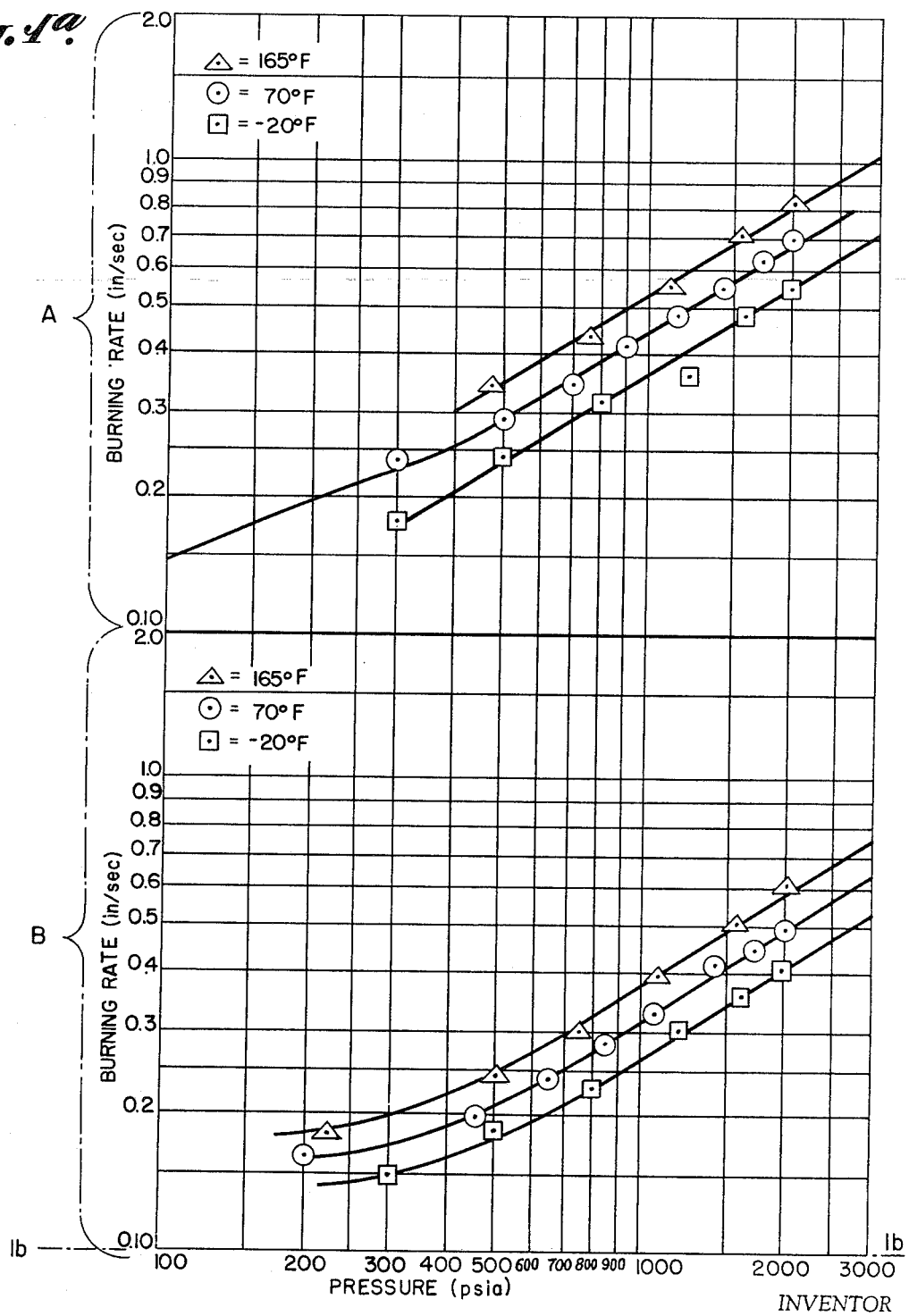

United States Patent [19]
Shaver

[11] 3,779,826

[45] Dec. 18, 1973

[54] NITROCELLULOSE PROPELLENT COMPOSITIONS CONTAINING INORGANIC OXIDIZING AGENTS WITH ALUMINUM

[75] Inventor: Robert G. Shaver, Burke, Va.

[73] Assignee: Atlantic Research Corporation, Fairfax, Va.

[22] Filed: Dec. 2, 1960

[21] Appl. No.: 73,452

[52] U.S. Cl............... 149/20, 149/21, 149/22, 149/113, 149/114
[51] Int. Cl............................................. C06d 5/06
[58] Field of Search .............. 52/0.5, 14; 60/35.4; 149/18, 20, 21, 76, 113, 114

[56] References Cited
OTHER PUBLICATIONS

Military Explosives, Department of the Army Technical Manual TM9–1910, Dept. of the Air Force Tech. Order TO11A–1–34, April 1955, p. 259.

Zaehringer, Missiles and Rockets, Vol. 5, No. 7, Feb. 16, 1959, p. 33.

Missiles and Rockets, Vol. 5, No. 18, May 4, 1959, p. 11.

Dougherty, Chem. Eng. Progress, Vol. 53, No. 11, Oct. 1957, pp. 489–492.

*Primary Examiner*—Benjamin R. Padgett
*Attorney*—Martha L. Ross

[57] ABSTRACT

A double-base propellant is provided having reduced pressure and temperature sensitivity and also increased burning rate by incorporating aluminum of small particle size, e.g., about 3 microns, and a solid inorganic oxidizer salt of coarse particle size, e.g., about 150 microns into the propellant.

12 Claims, 2 Drawing Figures

NITROCELLULOSE PROPELLENT COMPOSITIONS CONTAINING INORGANIC OXIDIZING AGENTS WITH ALUMINUM

This invention relates to new double-base propellants having improved ballistic properties.

The term "double-base" propellant is employed herein is a well-recognized generic term in the art and refers to nitrocellulose plasticized with a high-boiling liquid which dissolves the nitrocellulose to form a gel and which comprises at least about 50% by weight of an active, liquid, organic polynitrate, such as nitroglycerine, triethylene glycol dinitrate, diethylene glycol dinitrate, trimethylol ethane trinitrate, pentaerithrytol trinitrate, and mixtures thereof. Such liquids, like the nitrocellulose, are self-oxidant, namely contain combined oxygen available for combustion of other components of the molecule, such as carbon and hydrogen.

The liquid plasticizer can, additionally contain up to about 50% by weight of an inert, high-boiling, organic liquid, which contains molecularly-combined carbon and hydrogen, so that it functions as a fuel producing low molecular weight combustion gases, and is miscible with the nitrated plasticizer. The term "inert" as used herein means a compound which requires an external source of oxygen, e.g. an inorganic oxidizer salt, for combustion. Illustrative examples of such suitable liquid plasticizers include hydrocarbons, e.g. triethyl benzene, dodecane, phenyl xylylethane; esters, e.g. butyl laurate, dibutyl phthalate, triacetin, tributyl acetyl citrate, dioctyl adipate, etc.; alcohols, e.g. benzyl alcohol, diethylene glycol, triethylene glycol, etc., ethers, e.g. bis(dimethyl benzyl) ether; propylene glycol monobutyl ether, etc., ketones, e.g. isophorone; acids, e.g. caproic acid, n-heptylic acid; aldehydes, e.g. cinnamaldehyde; nitrogen-containing organic compounds such as nitriles, e.g. adiponitrile; phosphorous-containing compounds, e.g. tricresyl phosphate; sulphur-containing compounds, e.g. N-ethyltoluene sulfonamide; and many others.

The specific impulse of double-base propellants, can be very substantially increased by incorporating powdered aluminum into the composition as a solid fuel component and a solid inorganic oxidizing salt for combustion of the aluminum. Such high-performance propellants are assuming considerable importance in the rocket art. Unfortunately, as conventionally formulated, they are highly sensitive both to changes in combustion chamber pressure and to ambient temperature. The practice hitherto has been to use aluminum having a weight-average particle size of from about 8 to 50 microns and the inorganic oxidizing salt in a size dispersion such that a very substantial proportion or fraction has a maximum weight-average particle size of about 30 microns.

Propellants characteristically burn at higher rates as the pressure in the combustion chamber increases, the slope of the curve generally being defined by the pressure exponent n. Propellants having high pressure exponents, e.g. exponents substantially higher than about 0.5, are subject to undesirably high fluctuations in performance induced by relatively small changes in combustion chamber pressure. They can also be hazardous because of the large increase in burning rate produced by relatively slight increases in combustion chamber pressure, which, in turn, produces a further increase in chamber pressure and can eventuate in explosion of the rocket motor. Propellants of low sensitivity to pressure changes have the advantage of improved performance control and usefulness over a wider range of operating pressures.

Burning rate is also sensitive to differences in the ambient temperature of the propellant and increases with increasing temperature. Since environmental temperatures vary with place and season, this is a factor which can undesirably modify performance of the rocket. Reduced sensitivity of burning rate to propellant temperature can, therefore, often be of considerable importance.

The object of this invention is to provide double-base propellants containing powdered aluminum fuel, which are characterized by very substantially reduced sensitivity to variations in pressure and temperature.

Another object is to provide double-base propellants containing powdered aluminum which are characterized not only by reduced pressure and temperature sensitivity but also by very substantially increased burning rate.

Figure 1B:
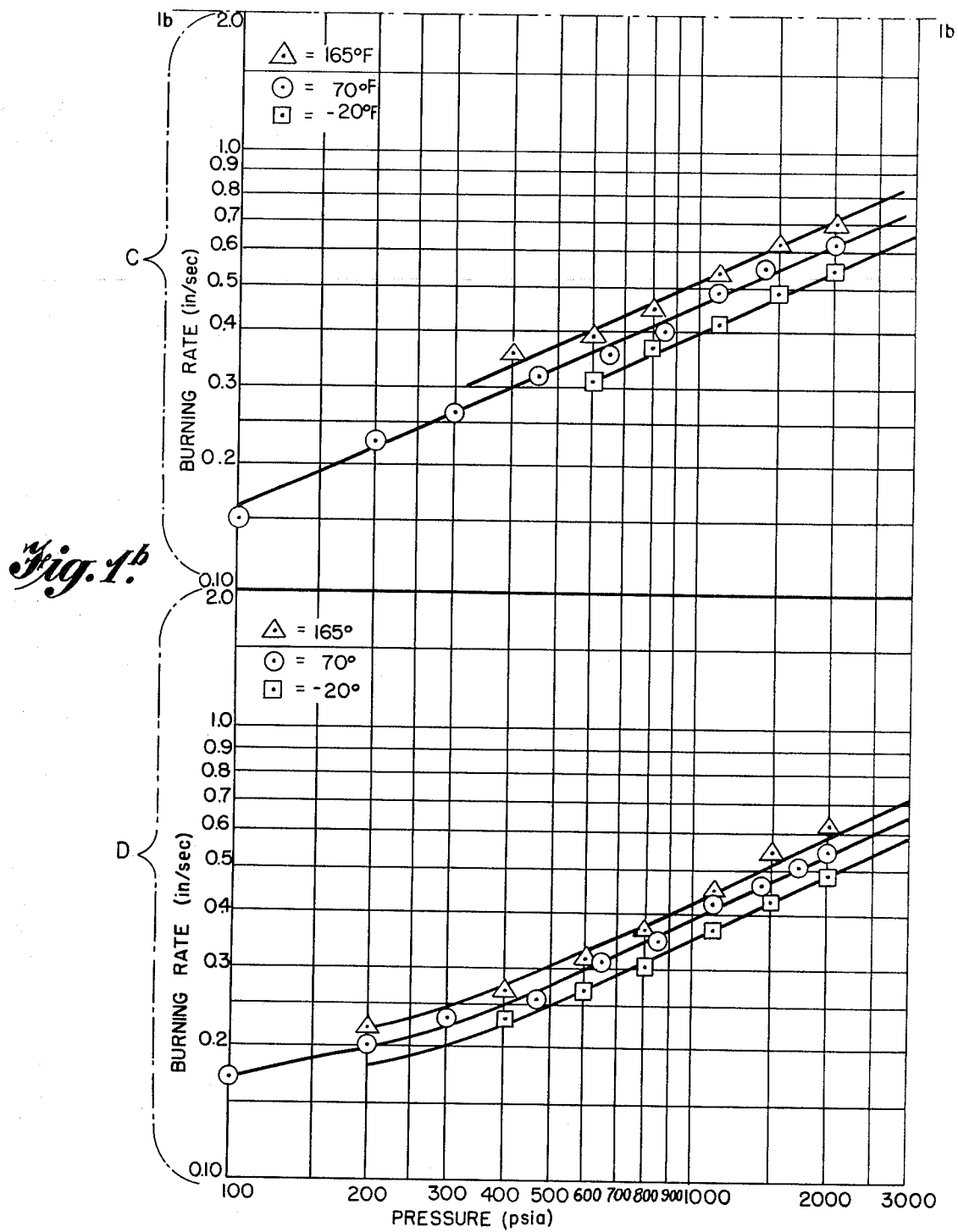

Other objects and advantages will become obvious from the following detailed description and the drawings, in which:

FIG. 1a and 1b comprises a series of graphs summarizing experimental ballistic data.

I have discovered that the ballistic properties of a double-base propellant, in terms of its sensitivity to changes in pressure and ambient temperature, can be improved to a remarkable and highly significant extent by incorporating aluminum of exceedingly small particle size and a solid inorganic oxidizer salt of relatively coarse particle size into the propellant. The weight average particle size ($D_{\overline{w}}$) of at least 15% by weight of the total aluminum added should not exceed about 3 microns, the preferred maximum $D_{\overline{w}}$ being about 2 microns. The minimum $D_{\overline{w}}$ of the oxidizer salt, determined on the basis of all of the salt present, should be about 150 microns, and is preferably about 200 microns.

The very fine particle size aluminum, when added in amounts as low as 1.0% by weight of the propellant, either as the sole aluminum additive or in combination with aluminum of larger particle size, substantially improves the pressure and temperature sensitivity of the propellant. Generally, the preferred minimum addition by weight is about 5%. In addition, the aluminum functions as a fuel, which, because of its high exothermic heat of combustion, increases the specific impulse of the propellant. Where maximized performance, as well as improved pressure and temperature sensitivity, is required for a particular application, the amount of aluminum added will generally be considerably higher than 1% by weight, and can, in fact, be as high as about 35% by weight.

The amount of aluminum employed in a particular double-base formulation is determined essentially by the particular ballistic requirements for a given rocket application and, obviously, therefore, can vary considerably. The physical properties of the propellant mix, in terms, for example, of castability, may also be a practical limiting factor in determining the maximum extent of aluminum inclusion, although it should be noted that since the double-base binder is, either entirely or to a very considerable extent, self-sufficient in its oxidizer requirement, the over-all solid inorganic oxidizer requirement is reduced, largely or entirely, to that needed for combustion of the aluminum. Thus, the amount of aluminum of a given particle size which can be incorporated into an active double-base binder without loss of castability is generally higher than can be achieved with an inert binder which depends on additional amounts of the solid inorganic oxidizer salt for combustion. In any case, the double-base binder must be present in sufficient amount to form a continuous matrix around the dispersed, insoluble solids, e.g. the aluminum and oxidizer salt. In general, the minimum binder required for adequate ballistic and physical properties is about 20% by volume of the composition.

The use of the very fine particle size aluminum tends to increase the viscosity of the propellant mix and thereby, to make processing more difficult. This does not, however, pose a serious problem, since a relatively small amount of the very fine aluminum is generally adequate to produce considerable improvement in pressure and temperature sensitivity and additional aluminum can be incorporated in larger particle sizes to achieve the desired performance. The coincidental requirement for oxidizer salt of relatively large particle size also improves processing.

It should be noted that the burning rate of the double-base propellant made according to my invention as aforedescribed is not substantially different from that made according to conventional practice, since the increased over-all size of the solid oxidizer salt particles tends to decrease burning rate and this counterbalances an increase in burning rate which might otherwise be effected by the reduced size of the dispersed aluminum. The burning rate can, however, be varied in either direction to some extent by manipulating the size of the aluminum and oxidizer components within the required range.

Although ammonium perchlorate is the preferred oxidizer, other inorganic oxidizing salts known to the propellant art can be used, such as the Na, K, and Li perchlorates and the ammonium and alkali metal nitrates.

The amount of oxidizer salt incorporated in the propellant should be sufficient to provide for active combustion of the metal fuel component (neglecting the oxygen combined in the double-base binder which is available for combustion of the binder.) The actual amount used is determined by the particular formulation and requirements for a given application and will vary with such factors as the desired specific impulse or boost velocity, the amount of inert plasticizer, if any, present, the desired oxidation level, e.g. oxidation of the organic fuel components to $CO + H_2$; or to $CO + H_2O$; or to $CO_2 + H_2O$. The particular formulation to meet specific requirements can readily be determined by calculation and routine test by those skilled in the art.

The propellant can be made by any of the conventional methods employed in the art such as by a milling or casting technique. A preferred method is the plastisol process in which the nitrocellulose, in the form of small, spherical particles (preferably under 100 microns, in diameter, the optimum being up to about 30 microns), the finely divided Al, the solid inorganic oxidizer, and any other solid additives, such as stabilizers, are dispersed in the liquid plasticizer to form a fluid slurry which is poured into a grain mold and is then cured by heating the mix to the solution temperature of the nitrocellulose in the plasticizer. Nitrocellulose dissolves readily in nitroglycerine and many other liquid plasticizers, such as many detailed above, only at elevated temperatures, the specific temperature varying, of course, with the grade of nitrocellulose and the particular plasticizer. This technique has numerous advantages, such as permitting the homogeneous incorporation of a high proportion of finely divided insoluble, inorganic solids, and eliminating plugging problems and any need for volatile solvents or the application of high consolidating pressures.

The pressure exponent of double-base propellants formulated in accordance with my invention as aforedescribed, can be reduced by as much as 25% or more, to as low as 0.5 or less, namely to a desirable level which has hitherto generally been achievable mainly with composite propellants using inert fuel binders.

Temperature sensitivity is also reduced to a remarkable degree. The temperature coefficient of burning rate at constant pressure ($\sigma p$) is reduced by as much as 50% or more. The temperature coefficient of burning rate at a constant ratio of burning surface area to throat area ($\pi_{k_n}$) is reduced by as much as 65% or more. The high temperature sensitivity of conventional double-base propellants has made it frequently necessary to subject the grain to temperature conditioning before firing. This obviously is time-consuming and requires equipment which may not be available under field conditions. Such a requirement is eliminated by the low temperature sensitivity of grains made according to my invention.

EXAMPLE 1

Propellant grains having the following chemical composition were prepared. Particle size of the aluminum and ammonium perchlorate were varied in the different samples, as indicated below:

| Ingredient | Parts by Weight |
| --- | --- |
| Nitrocellulose, $D_\overline{w}$ 15 microns | 21.50 |
| 2-Nitrodiphenylamine (2NDPA - stabilizer) | 1.00 |
| Nitroglycerine/dibutyl phthalate, 3:1 | 25.02 |
| Dibutyl sebacate | 2.48 |
| Ammonium perchlorate | 26.78 |
| Aluminum | 23.22 |

The grains were prepared by the plastisol method. The components were mixed at room temperature into a homogeneous slurry, which was then poured into a mold and heated to about 80°C to dissolve the nitrocellulose in the mixture of liquid plasticizers.

The burning rate of each of the sample grains, at different grain temperatures and at different chamber pressures, was measured in a Crawford strand burner. The results are summarized in the curves of FIG. 1. From these experimental data, the sensitivity of the burning rate to changes in combustion chamber pressure and to changes in ambient grain temperature were determined.

| | Particle Size | Parts by Weight |
| --- | --- | --- |
| Sample A | | |
| $NH_4ClO_4$ | $D_\overline{w}$ 25 microns | 13.39 |
| | $D_\overline{w}$ 200 microns | 13.39 |
| Al | $D_\overline{w}$ 18 microns | 23.22 |
| Sample B | | |
| $NH_4ClO_4$ | $D_\overline{w}$ 200 microns | 26.78 |
| Al | $D_\overline{w}$ 18 microns | 23.22 |
| Sample C | | |
| $NH_4ClO_4$ | $D_w$ 200 microns | 26.78 |
| Al | $D_w$ 1 micron | 23.22 |
| Sample D | | |
| $NH_4ClO_4$ | $D_\overline{w}$ 200 microns | 26.78 |
| Al | $D_\overline{w}$ 300 A | 10.00 |
| | $D_\overline{w}$ 18 microns | 13.22 |

The following table summarizes the ballistic data at a chamber pressure of 1000 psi.

TABLE I

| | B.R. in/sec at 70°F | $n^{(1)}$ | $\sigma_p$ %/°F | $\pi_{k_n}$ (2) %/°F |
|---|---|---|---|---|
| A | 0.44 | 0.62 | 0.21 | 0.56 |
| B | 0.32 | 0.64 | 0.19 | 0.53 |
| C | 0.46 | 0.47 | 0.13 | 0.25 |
| D | 0.38 | 0.48 | 0.10 | 0.19 |

(1) The value of the pressure exponent was the same at each of the three test temperatures, −20°F, 70°F, and 165°F.
(2) $\pi_{k_n} = \sigma_p/(1-n)$ The results clearly show the large and unexpected effect of combining very fine particle size aluminum powder with relatively coarse particle size oxidizer on $n$, $\sigma p$, and $\pi_{k_n}$. In samples A and B, 18 micron $D_{\overline{w}}$ Al was used with different size distributions of oxidizer, in the former with a mixture of 25 micron $D_{\overline{w}}$ and 200 micron $D_{\overline{w}}$ NH$_4$ClO$_4$ and in the latter with 200 micron $D_{\overline{w}}$ NH$_4$ClO$_4$ alone. The only appreciable difference between the two was a decrease in burning rate in Sample B, as was to be expected because of the larger average size of the oxidizer salt. The different size dispersions of the oxidizer with the 18 micron $D_{\overline{w}}$ Al had very little effect on pressure and temperature sensitivity. Substitution of all of the 18 micron $D_{\overline{w}}$ Al of sample B by 1 micron $D_{\overline{w}}$ Al (Sample C) or of part of the 18 micron $D_{\overline{w}}$ by 300 A $D_{\overline{w}}$ Al produces a sharp drop in propellant sensitivity. The somewhat lower burning rate of Sample D as compared with Sample C is apparently due to the presence of a substantial proportion of the 18 micron $D_{\overline{w}}$ Al. This indicates how particle sizes of the components, so long as they are within the range required to obtain the desired reduction in pressure and temperature sensitivity, can be manipulated to tailor the burning rate.

Although a pressure exponent of about 0.5 is generally satisfactory, in some applications an even lower sensitivity to fluctuation in pressure is desirable. I have discovered that a very substantial further decrease in such sensitivity can be achieved by the addition of a small amount, e.g. up to about 10% by weight, of a lead salt of an organic carboxylic acid, such as lead salicylate, lead resorcylate, lead stearate, and lead oleate. Such additives can be used to reduce the pressure exponent to less than 0.4. When used with the size dispersion of aluminum and oxidizer which effects the sharply reduced temperature and pressure sensitivity, the added Pb salts also produce a very substantial increase in burning rate. This catalytic phenomenon is completely unexpected since a similar effect on burning rate is not produced when the organic Pb salt is added to the conventional aluminized double-base propellant, such as Sample A of Example 1, although some decrease in pressure sensitivity is achieved.

EXAMPLE 2

Propellant grains were prepared according to the procedure of Example 1, as follows:
Sample E
  Same as Sample A, Example 1, plus 2.00 parts by weight of lead salicylate.
Sample F
  Same as Sample C, Example 1, plus 2.00 parts by weight of lead salicylate.
Sample G
  Same as Sample D, Example 1, plus 2.00 parts by weight of lead salicylate.

The following table summarizes the ballistic data at a chamber pressure of 1000 psi.

TABLE II

| | B.R. in/sec at 70°F | $n$ | $\sigma_p$ %/°F | $\pi_{k_n}$ %/°F |
|---|---|---|---|---|
| E | 0.43 | 0.52 | 0.21 | 0.44 |
| F | 0.52 | 0.37 | 0.13 | 0.21 |
| G | 0.46 | 0.43 | | |

Comparison of the ballistic test data summarized in Tables I and II shows that addition of the organic Pb salt produced some reduction in pressure exponent when added to the conventional formulation of Sample A, no appreciable change in burning rate or $\sigma_p$, and some reduction in $\pi_{k_n}$ because of the reduction in n.

When added to the formulation of Sample C, containing the very fine aluminum and relatively coarse NH$_4$ClO$_4$, the Pb salt not only further reduced the pressure exponent to 0.37, but also caused an unexpected and very substantial increase in burning rate, the increase in this case being 13%. As in the case of the conventional propellant, the Pb salt additive did not affect $\sigma_p$ and reduced $\pi_{k_n}$ because of its reduction of pressure sensitivity. When added to the formulation of Sample D, which contained a mixture of an ultrafine aluminum fraction and an 18 micron $D_{\overline{w}}$ fraction, the lead salt reduced the pressure exponent from 0.48 to 0.43 and increased burning rate by 21%.

EXAMPLE 3

Propellant grains having the following chemical composition were prepared by a procedure similar to that described in Example 1. Particle size of the Al and oxidizer salt were varied, as indicated.

| Ingredient | | Parts by Weight |
|---|---|---|
| Nitrocellulose, $D_{\overline{w}}$ 15 microns | | 17.50 |
| Trimethylol ethane trinitrate | | 28.25 |
| Polyethylene glycol | | 3.25 |
| Resorcinol | | 1.00 |
| Al | | 23.40 |
| NH$_4$ClO$_4$ | | 26.60 |
| | Particle Size | Parts by Weight |
| Sample H | | |
| NH$_4$ClO$_4$ | $D_{\overline{w}}$ 25 microns | 13.30 |
| | $D_{\overline{w}}$ 200 microns | 13.30 |
| Al | $D_{\overline{w}}$ 18 microns | 23.40 |
| Sample I | | |
| NH$_4$ClO$_4$ | $D_{\overline{w}}$ 200 microns | 26.60 |
| Al | $D_{\overline{w}}$ 300 A. | 10.00 |
| | $D_{\overline{w}}$ 18 microns | 13.40 |

The following table summarizes the data at a chamber pressure of 1000 psi.

TABLE III

| | B.R. in/sec at 70°F | $n$ | $\sigma_p$ %/°F | $\pi_{k_n}$ %/°F |
|---|---|---|---|---|
| H | 0.41 | 0.63 | 0.19 | 0.52 |
| I | 0.46 | 0.47 | 0.14 | 0.25 |

Although this invention has been described with reference to illustrative embodiments thereof, it will be apparent to those skilled in the art that the principles of this invention can be embodied in other forms but within the scope of the claims.

I claim:

1. In a propellant composition comprising a fuel binder consisting essentially of nitrocellulose gelled with a high-boiling, organic liquid plasticizer, at least 50 per cent by weight of said liquid plasticizer being a high-boiling, liquid organic polynitrate, said binder forming a continuous matrix containing finely-divided aluminum and a finely-divided, solid, inorganic oxidizing salt dispersed therein, the oxidizer being present in amount sufficient to provide for active combustion of said aluminum, the improvement wherein at least a portion of said aluminum comprises particles having a maximum weight-average particle size of about 3 microns, said portion comprising at least 1.0 percent by weight of said propellant composition and at least about 15 per cent by weight of total aluminum and said inorganic oxidizing salt having a minimum weight-average particle size of about 150 microns.

2. The propellent composition of claim 1 in which the portion of aluminum having a maximum weight average particle size of about 3 microns comprises at least about 5% by weight of the propellent composition.

3. The propellent composition of claim 1 in which the liquid organic polynitrate is nitroglycerine.

4. The propellent composition of claim 3 in which the oxidizer is ammonium perchlorate.

5. The propellent composition of claim 1 which includes in addition a minor proportion of a lead salt of an organic carboxylic acid.

6. The propellent composition of claim 2 which includes in addition a minor proportion of a lead salt of an organic carboxylic acid.

7. The propellent composition of claim 3 which includes in addition a minor proportion of a lead salt of an organic carboxylic acid.

8. The propellent composition of claim 4 which includes in addition a minor proportion of a lead salt of an organic carboxylic acid.

9. The propellent composition of claim 5 in which the organic lead salt is lead salicylate.

10. The propellent composition of claim 6 in which the organic lead salt is lead salicylate.

11. The propellent composition of claim 7 in which the organic lead salt is lead salicylate.

12. The propellent composition of claim 8 in which the organic lead salt is lead salicylate.

* * * * *